(12) United States Patent
Knoller et al.

(10) Patent No.: US 10,549,754 B2
(45) Date of Patent: Feb. 4, 2020

(54) LONGITUDINALLY GUIDING DRIVER ASSISTANCE SYSTEM IN A MOTOR VEHICLE

(71) Applicant: Bayerische Motoren Werke Aktiengesellschaft, Munich (DE)

(72) Inventors: Stefan Knoller, Munich (DE); Sebastien Mathieu, Fuerstenfeldbruck (DE); Florian Schmitt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 41 days.

(21) Appl. No.: 15/204,078

(22) Filed: Jul. 7, 2016

(65) Prior Publication Data

US 2017/0015320 A1  Jan. 19, 2017

(30) Foreign Application Priority Data

Jul. 14, 2015 (DE) .......................... 10 2015 213 190

(51) Int. Cl.
  *B60W 30/14* (2006.01)
  *B60K 31/00* (2006.01)
  (Continued)

(52) U.S. Cl.
  CPC .......... *B60W 30/146* (2013.01); *B60K 31/00* (2013.01); *B60W 50/14* (2013.01);
  (Continued)

(58) Field of Classification Search
  CPC ............... B60W 30/146; B60W 50/14; B60W 2720/106; B60W 2550/302;
  (Continued)

(56) References Cited

U.S. PATENT DOCUMENTS 8,751,133 B2  6/2014 Poulin
8,849,494 B1  9/2014 Herbach et al.
(Continued)

FOREIGN PATENT DOCUMENTS

CN       104507780 A    4/2015
DE  10 2004 042 382 A1  3/2006
(Continued)

OTHER PUBLICATIONS

German Office Action issued in counterpart German Application No. 10 2015 213 190.4 dated Feb. 23, 2016 (six pages).

*Primary Examiner* — Jeffrey C Boomer
(74) *Attorney, Agent, or Firm* — Crowell & Moring LLP

(57) ABSTRACT

A longitudinally guiding driver assistance system in a motor vehicle includes a detection system for detecting currently applying events and relevant events lying ahead, which require an adaptation of the permissible maximum speed, and a function unit which, when detecting a relevant event, while taking into account the location of the relevant event lying ahead, determines a location-dependent point in time, whose reaching causes the function unit to initiate an output of prompt information for permitting an automatic adaptation of the currently permissible maximum speed to a new permissible maximum speed. The function unit is designed, in the case of an activation of the longitudinally guiding driver assistance system, while taking into account a detected currently applying event, to initiate a first output of prompt information for permitting an automatic first setting of the currently applying permissible maximum speed as the new permissible maximum speed.

7 Claims, 2 Drawing Sheets

(51) Int. Cl.
   *B60W 50/14* (2012.01)
   *B60W 40/04* (2006.01)

(52) U.S. Cl.
   CPC ........ *B60K 2310/244* (2013.01); *B60W 40/04* (2013.01); *B60W 2540/04* (2013.01); *B60W 2550/14* (2013.01); *B60W 2550/22* (2013.01); *B60W 2550/302* (2013.01); *B60W 2720/106* (2013.01)

(58) Field of Classification Search
   CPC ......... B60W 2550/14; B60W 2540/04; B60W 2550/22; B60W 40/04; B60K 2310/244; B60K 31/00
   See application file for complete search history.

(56) References Cited

U.S. PATENT DOCUMENTS

| | | | |
|---|---|---|---|
| 8,996,224 | B1 | 3/2015 | Herbach et al. |
| 9,008,890 | B1 | 4/2015 | Herbach et al. |
| 9,014,904 | B2 | 4/2015 | Higgins-Luthman |
| 9,507,346 | B1 | 11/2016 | Levinson et al. |
| 9,937,923 | B2 | 4/2018 | Custer et al. |
| 9,940,528 | B2 | 4/2018 | Higgins-Luthman |
| 9,956,877 | B2 | 5/2018 | Nakade |
| 9,977,430 | B2 | 5/2018 | Shalev-Shwartz et al. |
| 2002/0022920 | A1* | 2/2002 | Straub ............... B60K 31/0058 701/93 |
| 2004/0193374 | A1 | 9/2004 | Hac et al. |
| 2006/0100769 | A1* | 5/2006 | Arai .................... B60W 30/16 701/96 |
| 2006/0184297 | A1 | 8/2006 | Higgins-Luthman |
| 2007/0050130 | A1* | 3/2007 | Grimm ............ G08G 1/096716 701/420 |
| 2008/0255746 | A1 | 10/2008 | Hellmann et al. |
| 2010/0217494 | A1* | 8/2010 | Heft ......................... B60T 7/22 701/70 |
| 2011/0112740 | A1 | 5/2011 | Hashimoto |
| 2012/0215416 | A1 | 8/2012 | Poulin |
| 2012/0253628 | A1* | 10/2012 | Maruyama .......... B60W 50/085 701/93 |
| 2012/0316746 | A1 | 12/2012 | Park |
| 2013/0219294 | A1 | 8/2013 | Goldman-Shenhar et al. |
| 2014/0200788 | A1 | 7/2014 | Eriksson et al. |
| 2014/0309864 | A1* | 10/2014 | Ricci ...................... H04W 48/04 701/36 |
| 2014/0330456 | A1 | 11/2014 | Lopez Morales et al. |
| 2015/0105993 | A1* | 4/2015 | Um ........................ B60K 31/00 701/93 |
| 2015/0112526 | A1 | 4/2015 | Martin et al. |
| 2015/0149059 | A1* | 5/2015 | Choi .................... B60W 30/146 701/96 |
| 2015/0192660 | A1* | 7/2015 | Dickow ........... G08G 1/096783 340/902 |
| 2015/0339928 | A1 | 11/2015 | Ramanujam |
| 2016/0082960 | A1* | 3/2016 | Slaton .................. B60W 50/08 701/93 |
| 2016/0125735 | A1 | 5/2016 | Tuukkanen |
| 2016/0214608 | A1* | 7/2016 | Packwood-Ace ..... B60W 30/14 |
| 2016/0264021 | A1 | 9/2016 | Gillett |
| 2017/0076201 | A1 | 3/2017 | van Hasselt et al. |
| 2017/0088038 | A1 | 3/2017 | Geller |
| 2018/0032082 | A1 | 2/2018 | Shalev-Shwartz et al. |
| 2018/0345948 | A1 | 12/2018 | Ulrich et al. |

FOREIGN PATENT DOCUMENTS

| | | |
|---|---|---|
| DE | 10 2007 005 245 A1 | 11/2007 |
| DE | 10 2008 018 421 A1 | 9/2009 |
| DE | 10 2010 054 241 A1 | 6/2012 |
| DE | 10 2012 102 564 A1 | 10/2012 |
| DE | 10 2012 010 865 A1 | 12/2012 |
| DE | 10 2012 211 967 A1 | 1/2014 |
| DE | 10 2012 213 229 A1 | 1/2014 |
| DE | 10 2013 205 609 A1 | 10/2014 |
| DE | 10 2013 209 064 A1 | 11/2014 |
| DE | 10 2014 017 522 A1 | 6/2015 |
| DE | 10 2014 215 673 A1 | 2/2016 |
| EP | 2 020 331 A1 | 2/2009 |
| JP | 2010-198578 A | 9/2010 |
| JP | 2012-206594 A | 10/2012 |

* cited by examiner

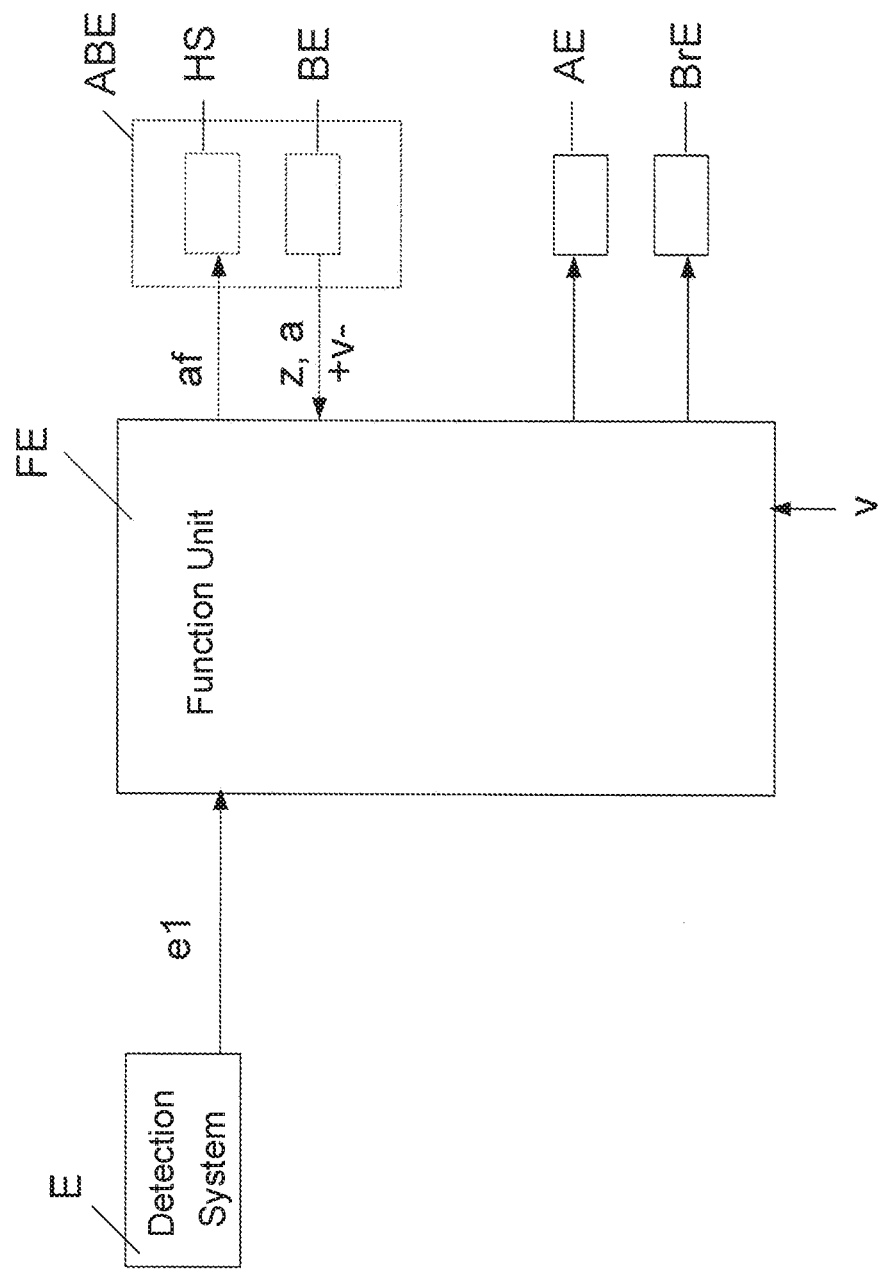

LONGITUDINALLY GUIDING DRIVER ASSISTANCE SYSTEM IN A MOTOR VEHICLE

CROSS REFERENCE TO RELATED APPLICATIONS

This application claims priority under 35 U.S.C. § 119 from German Patent Application No. 10 2015 213190.4, filed Jul. 14, 2015, the entire disclosure of which is herein expressly incorporated by reference.

This application contains subject matter related to U.S. application Ser. No. 15/204,055, entitled "Longitudinally Guiding Driver Assistance System in a Motor Vehicle" filed on even date herewith.

BACKGROUND AND SUMMARY OF THE INVENTION

The invention relates to a longitudinally guiding driver assistance system in a motor vehicle.

Basically many longitudinally guiding driver assistance systems further developed as speed control systems are already known, which automatically control the speed of the motor vehicle to a predefined desired or maximally permissible speed. In addition to these longitudinal control systems, currently longitudinal control systems expanded by a ranging control—so-called spacing-related longitudinally controlling systems or speed control systems—can already be purchased from some manufacturers. Such systems—offered, for example, by the applicant of the present patent application under the name "Active Cruise Control"—, make it possible to automatically guide the motor vehicle while maintaining a desired distance from the vehicle driving ahead at a desired or a correspondingly lower speed. When a distance sensing system mounted at the motor vehicle, which may operate particularly on a radar basis, detects in its own lane a target object or (motor) vehicle driving ahead, its own speed will be adapted—for example, by causing a suitable braking torque—to the speed of the motor vehicle driving ahead or of the target object, such that a distance control contained in the "active cruise control" or in the corresponding longitudinal control system automatically sets, depending on the situation, an appropriate distance from the motor vehicle driving ahead or the target object, and maintains this distance.

Furthermore, longitudinally guiding driver assistance systems further developed as so-called speed limiting systems are known, which prevent an exceeding of the permissible maximum speed set by the driver.

German Patent document DE 10 2012 211 967 A1 describes a combination of a speed limiting system and a speed control system, in which case, the permissible maximum speed of the speed limiting system can be applied, instead of the adjusted set speed, as the (new) desired or target speed for the speed control.

Finally, in newer vehicles, there are also driver assistance systems which detect, either from map data of a navigation system and/or by way of image processing, in an anticipatory manner, a speed limitation, and are capable of constantly, as soon as a speed limit has been reached, indicating the latter to the driver, so that, independently and as required, the driver can adapt his speed to the speed limit (for example, BMW Speed Limit Info).

From German Patent document DE 10 2008 018 421 A1, a driver assistance system is known for sending and receiving speed data and/or traffic density data for controlling a speed control system, which, by means of the received data, determines a permissible maximum speed and reports the latter to the driver by the output of corresponding information. The driver can apply this target of the permissible speed by a simple activation to his speed control system.

From the still unpublished German Patent Application DE 10 2014 215 673 A1, a longitudinally guiding driver assistance system is also known which, when an imminent event is detected that requires a speed reduction, determines a deceleration strategy and, at a defined point in time before the event has been reached, outputs prompt information to the driver for permitting the automatic implementation of the deceleration strategy. When the driver acknowledges the prompt information, an automatic implementation of the deceleration strategy is caused. The detection unit can detect or recognize a relevant event either on the basis of map data (for example, of a navigation device) or on the basis of camera data.

It is now an object of the invention to provide an improved driver assistance system having an offer display, which can be comprehended by the driver, for the automatic application of a new set speed.

This and other objects are achieved by a driver assistance system for a motor vehicle according to the invention having essentially a detection system for detecting currently applying and relevant events lying ahead, which require a change of the permissible maximum speed, and a function unit which determines a location-dependent point in time when a relevant event is recognized, while taking into account the location of the relevant event (and, as required, additional necessary information, such as a determined permissible maximum speed at the location of the relevant event, the differential speed between the vehicle and a determined new permissible maximum speed, detected clear travel or following travel, current or permitted deceleration operating modes of the vehicle, such as sailing operation, coasting operation, braking operation). When this point in time has been reached, the function unit initiates an output of prompt information for permitting an automatic adaptation of the currently permissible maximum speed to a new permissible maximum speed. When an event lying ahead is detected in time, ideally a deceleration strategy of the vehicle is determined for reaching the determined permissible new maximum speed (at least approximately) at the location of the relevant event. By way of the determined deceleration strategy, the location-dependent point in time to be determined will then, as a rule, be obtained, at which the output of prompt information for permitting an automatic adaptation of the currently permissible maximum speed or the output of prompt information for permitting an automatic adaptation of the currently permissible maximum speed to a new permissible maximum speed will be initiated.

When, in the case of an output of prompt information, a permission acknowledgment triggered (manually)—for example, by actuating an operating element—is detected, when adapting the permissible maximum speed (at least during clear travel), a triggering of the driving and/or braking sensor system is initiated while taking into account the new permissible maximum speed by the output of a corresponding desired acceleration value, so that, at least in the case of clear travel—and a possibly higher manually predefined permissible desired maximum speed—the vehicle speed is controlled to the new permissible maximum speed.

Events lying ahead may, for example, be temporary or permanent speed limitations, which are either indicated directly on traffic signs or can be derived therefrom according to the general traffic rules (in Germany, for example, the speed limit for driving through built-up areas is 50 km/h). Likewise, the event may also be one that terminates the speed limitation or at least increases it to a new maximum speed, which usually occurs, for example, when leaving a built-up area.

The (new) permissible maximum speed relevant to the longitudinally guiding driver assistance system at the location of the event lying ahead may either be the actually predefined new speed limit or a speed that deviates from the predefined new speed limit by a predefined amount in the upward or downward direction. In this case, the amount and the direction of the deviation may, for example, also be adjustable by the driver in a central vehicle menu. This new maximum speed can be transmitted directly to the function unit, or can only be determined in the function unit on the basis of the available information.

As an alternative or in addition, it is also contemplated that, on a route known to the driver, the driver himself defines speed limits according to the location by way of an interface inside or outside the vehicle. When traveling the route with the active longitudinally guiding system, these speed limits can correspondingly be taken into account as new maximum speeds. In this case, the driver can, for example, in advance also select whether he wants to always have all self-defined speed limits taken into account, or only speed limits selected corresponding to a rule (for example, on a certain route, for defined route categories, at a defined time of day, as a function of weather conditions, etc.) Several speed profiles may also be created for a defined route section, which will then be active corresponding to predefined rules (speed profile for good route conditions, speed profile for wet routes and/or speed profile for snow-covered routes).

The function unit can further be set up to initiate a retraction of the output of a prompt information when a permission acknowledgment is recognized. When a (manually) triggered refusal of the prompt information is detected, the Output of the prompt information is also retracted.

The invention is based on the following recognition: When a longitudinally guiding driver assistance system—further developed as described above—is activated (for the first time), in the case of longitudinally guiding systems known so far, the last used set speed is used as the set speed or as the (new) permissible maximum speed or the current speed is used as the permissible maximum speed. As a result of the possibility of detecting currently applying relevant events, which require an adaptation or, in the case of a first activation, as required, also a first-time predefinition—of the permissible maximum speed, it is provided according to the invention that the function unit is further designed for initiating, in the case of an activation of the longitudinally guiding driver assistance system, while taking into account a detected currently applying event and the permissible maximum speed determined on the basis of the detected currently applying event, a first output of a prompt information for permitting an automatic first setting of the currently applied permissible maximum speed as the new permissible maximum speed. A first setting is either an adaptation of the permissible maximum speed automatically defined with the activation of the longitudinally guiding driver assistance system or an actual first predefinition of a permissible maximum speed.

The function unit is advantageously designed for initiating the first output of the prompt information for permitting an automatic first setting of the currently permissible maximum speed immediately after the activation of the longitudinally guiding driver assistance system and availability of the relevant information for determining the permissible maximum speed. Or, it may be initiated only after a predefined (fixedly defined or variably definable) time interval and/or route interval after the activation of the longitudinally guiding driver assistance system.

In addition to the above-mentioned recognition, a particularly advantageous further aspect of the invention is based on a further recognition: When the vehicle equipped with the longitudinally guiding driver assistance system is situated, for example, a short distance before entering a built-up area, 100 km/h would first be offered to the driver as the new permissible maximum speed when the longitudinally guiding system is activated, although the entrance to the built-up area with a permissible maximum speed of 50 km/h is situated ahead. The acceptance of the offer would accelerate the vehicle to 100 km/h. Because of the imminent entering into the built-up area, the driver would be offered 50 km/h as the new permissible maximum speed still during the acceleration operation (or shortly after the acceleration operation). Such a prompting sequence would not be comprehensible to the driver.

In order to prevent such an implausible behavior of the longitudinally guiding driver assistance system, it is provided in an advantageous further aspect of the invention that the function unit is designed for initiating the first output of the prompt information for the first setting of the currently applying permissible maximum speed when activating the longitudinally guiding driver assistance system while taking into account a detected event lying ahead, which after the permission of the first-time setting of the permissible maximum speed requires a (re-)adaptation of the permissible maximum speed. In particular, the function unit may, for example, be designed for not initiating or preventing, after the activation of the longitudinally guiding driver assistance system, the first output of the prompt information for the first setting of the currently applying permissible maximum speed, when an anticipatory speed limit with a lower maximum speed is detected in the near future, thus, an event lying ahead, which competes with the current speed or, after the permission of the first setting, with the permissible maximum speed.

A competing event can be detected by evaluating many different parameters. In an advantageous further aspect of the invention, a competing event lying ahead will be detected, for example, when the competing event would require an adaptation of the maximum speed to a new maximum speed, which is lower than the permitted (new) maximum speed permitted after the permitting of the first setting of the permissible maximum speed, and/or when the current speed of the vehicle is lower than the permissible maximum speed determined on the basis of the current relevant event.

An event, which competes in this manner, can be detected, for example, as a function of a permitted determined deceleration strategy, for reaching the new permissible maximum speed determined on the basis of the (possibly competing) event lying ahead, and/or as a function of a permitted acceleration strategy for reaching the permissible maximum speed determined on the basis of the currently applying event. A competing event is recognized, for example, when the location-dependent point in time, at which a change could (at the earliest) take place very early with respect to time and/or location from an acceleration strategy first initiated or initiatable because of the actual event to a deceleration strategy to be initiated on the basis of the event lying ahead.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic diagram of an exemplary construction of a longitudinally guiding driver assistance system designed as a speed control system in a motor vehicle, for controlling the speed to a desired speed.

DETAILED DESCRIPTION OF THE DRAWINGS

Figure 2A:
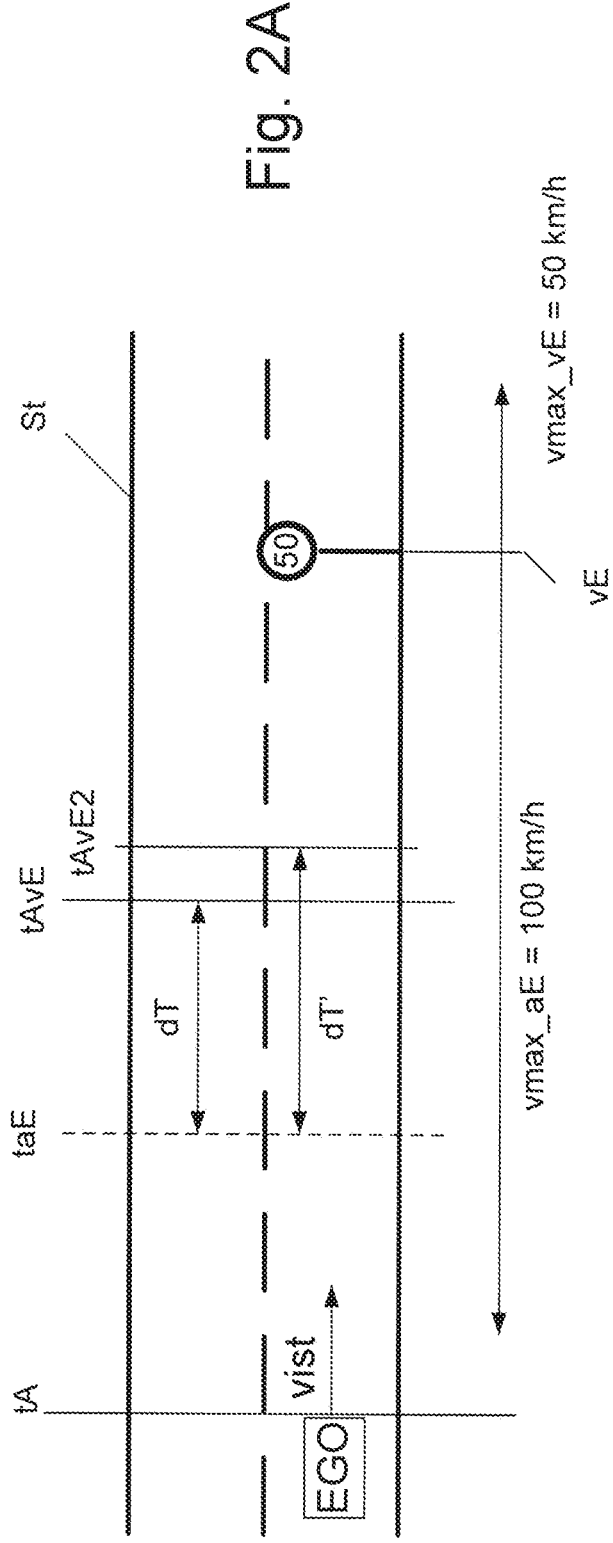
FIGS. 2A and 2B are views of a traffic situation and a corresponding graph, respectively, which influence the first output of prompt information for permitting an adaptation of the permitted maximum speed.

FIG. 1 illustrates in detail, as a central element of a longitudinally guiding driver assistance system, a function unit FE. The function unit FE may be a microprocessor based function unit that carries out its functionality. The function unit FE receives input signals e1 of a detection system E, a speed signal v, a permission signal z for permitting an automatic adaptation of the permissible maximum speed, a rejection signal a for rejecting the permission of the automatic adaptation of the permissible maximum speed, and a signal +v− for the manual adaptation of the permissible maximum speed.

The detection unit E is a map-based detection unit E which, by means of available map data, the own position and a known route section lying ahead, detects events that require an adaptation of the permissible maximum speed (such as the speed limit) or that permit it (such as the elimination of a speed limit). The map-based detection unit E is further developed such that, on the one hood, it detects the location of the current and relevant event lying ahead, thus also the amount of the maximally permitted limit speed applicable from this location, and transmits it to the function unit FE by signal e1.

The map-based detection unit E can further detect, by means of available map data—and, as required, while taking into account a planned driving route, available information concerning the course of the route, such as traffic circles, tight turns and/or turnoffs, and transmit the information to the function unit. From this information concerning the course of the route, relevant events can also be derived which require an adaptation of the permissible maximum speed.

Additionally, but not illustrated here, the function unit FE may be connected to a camera-based detection unit which, by means of the data of a forward-oriented sensor system (for example, a video sensor system), also detects speed-limiting events lying ahead, which may conceivably require an adaptation of the permissible maximum speed to anew maximum speed. In contrast to the map-based detection unit E, the camera-based detection unit can first detect the relevant locations on the basis of the sensor system only in an anticipatory fashion and only relatively quickly, or—because of the required signal processing—also only after the passing of the relevant event.

As soon as relevant data e1 concerning the location of a relevant event lying ahead, the amount of the limit speed maximally permitted starting from this location and information concerning the currently permitted limit speed, are available to the function unit FE, the function unit FE can first—taking into account a driver predefinition—determine the permissible maximum speed at the current location and at the location of the event lying ahead. As an alternative, the transmitted maximally permitted limit speed can be used directly as the permissible maximum speed.

By means of available additional relevant data, such as the relative speed difference between the vehicle and the determined new permissible maximum speed, the distance to the relevant location, the currently applying permissible maximum speed, information as to whether the vehicle is in a clear-travel mode at a currently applying permissible maximum speed or in a following-travel mode at a lower than the currently applicable permissible maximum speed, the current relevant information concerning the course of the road, particularly a determined recommended maximum speed, a determined deceleration strategy, a predefined minimum offer duration and/or a predefined maximal distance, the function unit FE initiates at a defined point in time the output of a prompt signal by a corresponding signal af to a display operating unit ABE. The display operating unit ABE comprises an information system HS and an operating system BE. Depending on the further development of the speed control system, according to a first alternative, the output can basically only be initiated when the determined new permissible maximum speed is lower than the desired speed maximally predefined by the driver. According to a second alternative, the output can take place independently of a desired maximum speed possibly predefined by the driver.

The operating element BE, by which the driver can acknowledge the prompt information, is further developed such that, at those times at which no prompt information is outputted, the driver can request a manual adaptation of the maximally desired speed +v−. In addition, the operating element BE is further developed such that, in the case of an output of the prompt information, by way of a first actuating mode, the driver can acknowledge the requested permission of the automatic adaptation of the permissible maximum speed (signal z), or, by way of a second actuating mode, can reject the requested permission of the automatic adaptation of the permissible maximum temperature (signal a).

Only when the driver acknowledges the prompt signal during the output of the prompt information by actuating the operating element BE according to the first actuating mode, will the display operating unit ABE send back a corresponding "permission" signal z to the function unit FE. The function unit FE will then start the initiation of the automatic adaptation of the permissible maximum speed and—corresponding to the new maximum speed—(if possible) an adaptation of the speed control while taking into account the new permissible maximum speed by causing a corresponding triggering of the driving unit AE and/or the braking unit BrE. For example, when the vehicle is in the so-called "clear-travel" mode, particularly in the case of a speed reduction, a controlling of the speed will take place for reaching the new maximum speed at the location of the relevant event. When the vehicle is in the so-called following mode with respect to a target object driving ahead, the following-travel control will (at first) be continued while taking into account the new permissible maximum speed. Simultaneously, when the manually triggered permission acknowledgment z is recognized, the retraction of the output of the prompt information will be initiated.

When, during of the output of the prompt information, the driver, by actuating the operating element BE according to the second actuating mode, rejects the permission of the automatic adaptation of the permissible maximum speed, the display operating unit sends a signal a back to the function unit FE. The function unit will then reject the newly determined permissible maximum speed and continue the current speed control. Simultaneously, when the manually triggered rejection is detected, the retraction of the output of the prompt information will be initiated.

In view of the invention, by means of available data e1, the function unit FE is now designed for first, determining the currently permitted permissible maximum speed, when the longitudinally guiding driver assistance system is activated. The function device FE simultaneously examines, as required, while taking into account the current vehicle speed v, whether events lying ahead are recognized which require a permissible maximum speed that competes with the current permissible maximum speed. In particular, a competing event will be recognized when at first an acceleration of the vehicle (for reaching the currently applicable permissible maximum speed) would be necessary and, within a defined time period, a subsequent deceleration of the vehicle for reaching the (reduced) permissible maximum speed would be required at the location of the event lying ahead. Such a detection may take place, for example, in that the function unit FE determines an acceleration strategy, which could be implemented in order to accelerate the vehicle at least in the direction of the currently applicable permissible maximum speed, and determines a deceleration strategy, which would have to be implemented in order to reach the new permissible maximum speed at the location of the event lying ahead. The time- and/or location-related spacing of the intersection point of the two strategies, thus, that point at which a display for permitting the new permissible maximum speed would have to be activated in order to, after the permission of the adaptation, request the change from the acceleration strategy to the deceleration strategy, will be taken into account such that, in the case of a distance between the current vehicle position and the intersection point that falls below a predefined limit distance, a first output of a prompt information for permitting the automatic first setting of the permissible maximum speed would be suppressed. When the distance between the current vehicle position and the first-determined intersection point is sufficiently large, thus larger that the predefined distance, the first output of the prompt information for permitting the adaptation or the first setting of the permissible maximum speed currently applicable because of the currently applying situation will be initiated immediately after the activation of the system and the availability of all relevant information or at a defined time- and/or location dependent point in time after the activation of the longitudinally guiding driver assistance system.

A corresponding approach for determining whether, after the activation of the longitudinally guiding driver assistance system, a first display for permitting an automatic first setting of a permissible maximum speed is to be initiated or suppressed, will be explained by use of the illustration in FIGS. 2A and 2B.

Figure 2B:
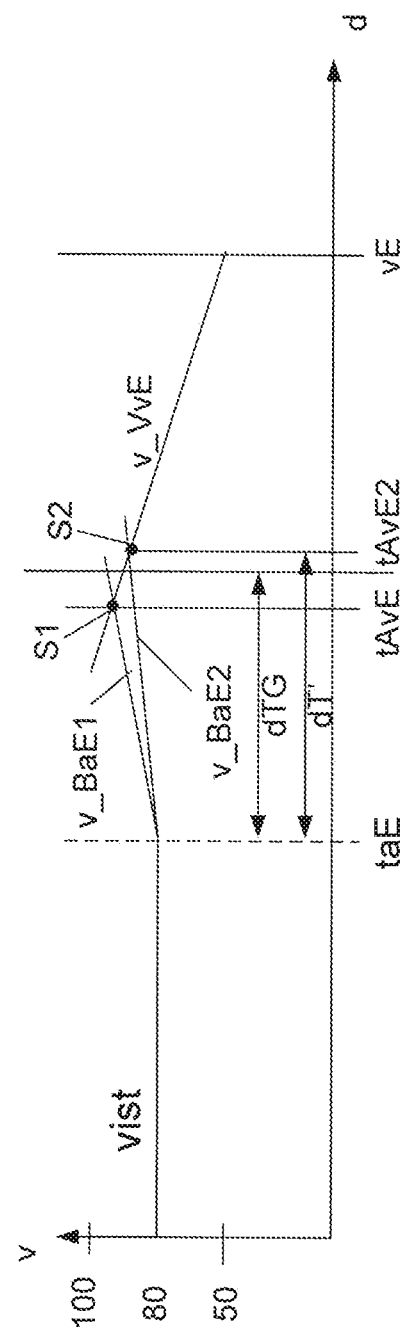

FIG. 2A illustrates a course of a road St, on which a vehicle EGO equipped with a longitudinally guiding system according to the invention is moving at an own speed vist of approximately 80 km/h in the direction of a speed limit sign vE lying ahead, which permits a permissible maximum speed vmax_vE of 50 km/h. Before the speed limit sign vE, a permissible maximum speed of vmax_aE of 100 km/h is allowed.

The driver of the vehicle EGO activates the longitudinally guiding driver assistance system at the current location tA, whereupon the currently applicable permissible maximum speed vmax_aE is determined. The location taE or the location-dependent point in time taE marks that point at which the first output of the prompt information for permitting the adaptation or the first setting of the permissible maximum speed vmax_aE currently applicable as a result of the currently prevailing situation could be initiated. This location taE is either determined by the fact that the first display would be initiated at a defined point in time after the activation tA of the longitudinally guiding driver assistance system or when all necessary information is available.

The location tAvE or the location-dependent point in time tAvE characterizes that point at which a prompt information for permitting an automatic adaptation of the permissible maximum speed to the new permissible maximum speed applicable from the location of the speed limit sign would have to be initiated in order to reach this new permissible maximum speed at the speed limit sign. This location tAvE is obtained by the intersection point S1 between the acceleration v_BaE1 (see bottom illustration of FIG. 2B), which can be implemented on the basis of the acceleration strategy, starting at the location of the conceivable first output taE, and the deceleration v_VvE, which can be implemented on the basis of the determined deceleration strategy, in order to be able to achieve the then applicable permissible maximum speed vmax_vE at the location of the event vE lying ahead.

In this example, the distance dT between the location taE of the conceivable first output and the location tAvE of the "$2^{nd}$" output of the prompt information is not analyzed as to whether an event lying ahead is present that competes with the first output (acceleration prompt). When the distance dT is shorter than a predefined limit distance dTG, the first output of the prompt information will be suppressed, but if the distance dT is longer than the predefined limit distance dTG, the first output will be initiated.

As an alternative to the suppression of the first output of the prompt information, it would also be contemplated to use, instead of the original acceleration strategy, a new acceleration strategy with a lower acceleration vBaE2 and therefore determine and correspondingly analyze the then resulting new intersection point S2 between the acceleration v_BaE2 implementable on the basis of this determined acceleration strategy, also beginning at the location of the possible first output taE, and the deceleration v_VvE implementable on the basis of the determined deceleration strategy. In this example, the distance dT' between the location taE of the conceivable first output and the location tAvE2 of the "$2^{nd}$" output of the prompt information will be longer than the predefined limit distance dTG, so that the event lying ahead will not be classified as being competitive. Accordingly, the first output of the prompt information is initiated first, and the output of the second prompt information is initiated when the new location tAvE2 is reached. If the distance were still shorter than the predefined limit distance dTG, the first output would finally be suppressed.

A driver assistance system further developed in this manner could prevent driver irritation when activating the system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinally guiding driver assistance system in a motor vehicle, comprising:

a driving unit and a braking unit, together configured to control the motor vehicle speed according to a permissible maximum speed;

a detection system comprising a navigation system and/or a camera, wherein the detection system is configured to detect current events and relevant events ahead of the motor vehicle, which events require adapting the permissible maximum speed; and a microprocessor communicatively coupled to the driving unit, the braking unit, and the detection system, the microprocessor configured to:

upon detection of a relevant event ahead of the motor vehicle, while taking into account a location of the relevant event, determine a location-dependent point in time, upon reaching the location-dependent point in time, initiate an output of prompt information for permitting an automatic adaptation of a currently permissible maximum speed to a first new permissible maximum speed, upon activation of the longitudinally guiding driver assistance system, while taking into account a detected current event, initiate a first output of a prompt whose acceptance by the user permits an automatic first setting of the currently permissible maximum speed to the first new permissible maximum speed, upon activation of the longitudinally guiding driver assistance system and in response to determining that a detected further relevant event ahead of the motor vehicle would require subsequently adapting the permissible maximum speed to a second new permissible maximum speed that is lower than the first new permissible maximum speed resulting from permitting the first setting, suppress the initiation of the first output of the prompt, upon activation of the longitudinally guiding driver assistance system and in response to determining that a current speed is lower than the second new permissible maximum speed, suppress the initiation of the first output of the prompt, and signal the driving unit and/or the braking unit to control the motor vehicle speed in accordance with the second new permissible maximum speed.

2. The longitudinally guiding driver assistance system according to claim 1, wherein the microprocessor is further configured to initiate the first output of the prompt after a predefined time interval and/or route interval from the activation of the longitudinally guiding driver assistance system.

3. The longitudinally guiding driver assistance system according to claim 1, wherein the microprocessor initiates the first output of the prompt while taking into account the detected relevant event that requires adapting the permissible maximum speed.

4. The longitudinally guiding driver assistance system according to claim 1, wherein the relevant event and the further relevant event are each detectable as a function of a respective permitted determined deceleration strategy for reaching the respective new first or second permissible maximum speed.

5. The longitudinally guiding driver assistance system according to claim 4, wherein the relevant event lying ahead is detectable as a function of a permitted acceleration strategy for reaching the new permissible maximum speed determined based on the currently applicable event.

6. The longitudinally guiding driver assistance system according to claim 1, wherein the relevant event and the further relevant event are each detectable as a function of a respective permitted acceleration strategy for reaching the respective new first or second permissible maximum speed.

7. A longitudinally guiding driver assistance system in a motor vehicle, comprising:

a driving unit and a braking unit, together configured to control a current speed of the motor vehicle speed according to a set maximum speed;

a detection system comprising a navigation system and/or a camera, wherein the detection system is configured to detect current events and relevant events ahead of the motor vehicle, which events require adapting the maximum speed; and a microprocessor communicatively coupled to the driving unit, the braking unit, and the detection system, the microprocessor configured to:

determine a first point-in-time at which to potentially output a first prompt to a user of the motor vehicle, the first prompt suggesting the maximum speed be set to a first speed, determine, based on a detected relevant event ahead, a second point-in-time at which to potentially output a second prompt to the user, the second prompt suggesting the maximum speed be set to a second speed, output the first prompt to the user upon reaching the first point-in-time, suppress outputting the first prompt in response to determining that the second speed is lower than the first speed, suppress outputting the first prompt in response to determining that the second speed is greater than the current speed, and set the maximum speed to the first speed in response to the first prompt being accepted by the user, signal the driving unit and/or braking unit to control the current speed in accordance with the maximum speed.

* * * * *